No. 722,030. PATENTED MAR. 3, 1903.
C. H. MERZ.
APPARATUS FOR MEASURING AND INDICATING ELECTRICITY SUPPLY.
APPLICATION FILED SEPT. 25, 1902.
NO MODEL. 2 SHEETS—SHEET 1.
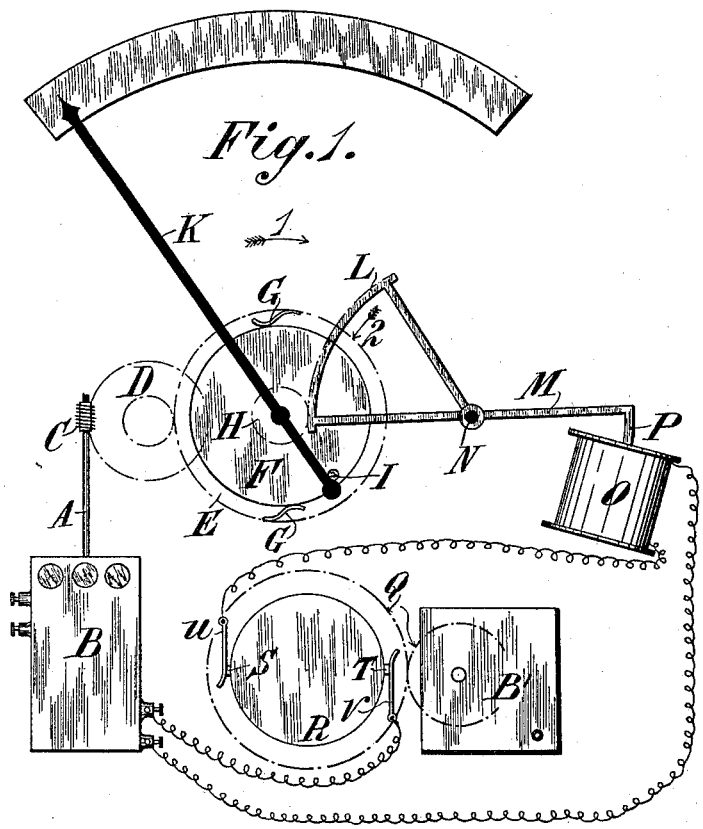

No. 722,030. PATENTED MAR. 3, 1903.
C. H. MERZ.
APPARATUS FOR MEASURING AND INDICATING ELECTRICITY SUPPLY.
APPLICATION FILED SEPT. 25, 1902.
NO MODEL. 2 SHEETS—SHEET 2.
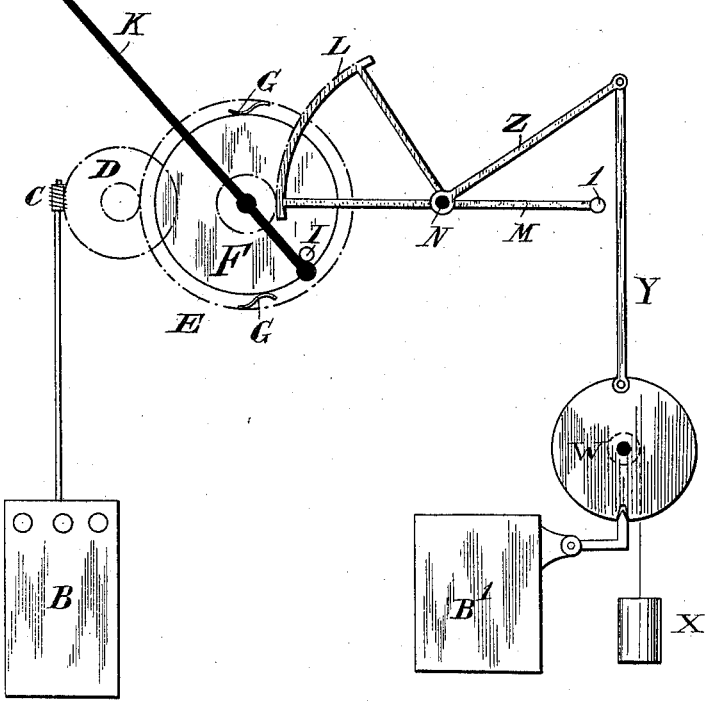
Witnesses.
Inventor.

UNITED STATES PATENT OFFICE.

CHARLES HESTERMAN MERZ, OF WESTMINSTER, ENGLAND.

APPARATUS FOR MEASURING AND INDICATING ELECTRICITY-SUPPLY.

SPECIFICATION forming part of Letters Patent No. 722,030, dated March 3, 1903.

Application filed September 25, 1902. Serial No. 124,377. (No model.)

*To all whom it may concern:*

Be it known that I, CHARLES HESTERMAN MERZ, a subject of the King of Great Britain and Ireland, residing at Westminster, in the county of London, England, have invented Apparatus for Measuring and Indicating an Electricity-Supply, of which the following is a specification.

As is well known, in charging for electricity the price per unit is sometimes made dependent upon the proportion between the maximum and the average power demanded during the period charged for, and instruments used for recording such maxima have been made more or less sluggish in action to meet cases in which—as, for example, in the case of electricity for motive power—the demand has been liable to considerable fluctuations and large currents have been taken only exceptionally and during periods so short that in practice it has been deemed unnecessary to record them. In order to overcome difficulties inherent to these hereinbefore-described systems of charging or in the current-maximum-demand-indicating apparatus used in connection with them, the price per unit of electricity supplied may be made dependent on the maximum amount that has been used in one of several shorter periods of time comprised within a longer period of time— viz., the period charged for. An apparatus according to this invention and by means of which such a system of charging is provided for, but which nevertheless may, if required, be used for other purposes, comprises combined measuring and indicating apparatus such as will integrate the amount of electricity that shall have been used during each of the shorter periods and will indicate the largest of these several amounts. Thus it will be understood that the apparatus is such that, if, for example, it be constructed or set for indicating the maximum quantity of electricity supplied during any one of a number of periods of one hour then in use it will indicate that quantity that will have passed through the apparatus in that hour of its working during which the maximum quantity will have passed through. An apparatus for this purpose comprises an integrating electricity-meter so arranged in relation to recording-gear as to drive the same in one direction for actuating an indicator, and the said recording-gear is so constructed that the portion thereof which actuates the indicator can be set back, and suitable means are arranged in connection with such portion whereby the setting back is effected at predetermined regular intervals of time without thereby altering the position for the time being of the indicator. Thus it will be understood that the indicator is only moved forward when that portion of the gear which actuates it travels during any one of the shorter periods of time farther than it has done in any previous like period. In some cases when the integrating measuring apparatus is clock-driven the driving-clock of the meter may also be caused to perform the setting back of the gear for actuating the indicator. The integrating mechanism which is used to actuate the demand-indicator may serve also to indicate on a separate dial the total consumption of electricity in British Board of Trade or other units in the usual manner.

In the accompanying illustrative drawings, Figures 1 and 2 are diagrams illustrating two arrangements of apparatus according to this invention for measuring and indicating an electricity-supply.

Referring to Fig. 1, A is the spindle of a recording-meter B, revolving at a speed which varies with and is proportional to the amount of energy or current passing through the meter. This spindle drives by suitable means, such as a worm C and a train of gearing D, a frictional driving means which forms a friction-clutch and comprises two rotary parts E and F, that are mounted on the shaft and of which E, which may be one of the wheels of the gearing D, carries springs G, which bear on the periphery of and drive the part F. The driven part F of the clutch carries a wheel H and a projection I, which latter pushes an indicator K around with it. This indicator is so mounted that it will remain at rest in any position into which it is moved by the projection I. L is a sector that is in gear with the wheel H, so that it can be turned thereby in one direction. M is a lever pivoted at N and whereby the sector L, wheel H, and rotary part F of the clutch can be turned in the opposite direction. The arrangement is such that assuming the clutch and indicator to be moving about their common axis in the direction of the arrow 1 then the sector L is being moved in the direction of the arrow 2; but at the end of each predetermined period of time a clock, which may be part of the meter or not, will by some suitable device cause the sector L to be moved up again, and so return to its starting position that portion F of the clutch which carries the projection I. This may be effected in various ways. It is preferred to use an electric arrangement in which the clock B' may actuate a device which closes an electric circuit, so as to energize a coil O and attract an iron armature or core P, attached to the lever M of the sector L. For this purpose, for example, the clock B' may drive through gearing Q a drum R, having insulated but connected contacts S and T thereon, which are touched by brushes U and V at regular intervals as the drum revolves, and thereby complete an electric circuit through the said coil O, or where an electric clock is used, as is assumed in the arrangement illustrated, it may be organized to close its own circuit at regular intervals of time and also that of the coil O, which then forms a part of the same circuit, or mechanical means may be employed for returning the sector L to its raised position. For example, the clock B' may wind up a spring or weight and release the same at the end of each required interval of time, the spring or weight when released acting to cause the sector L to return to its starting position, or the clock may release a spring or weight already wound up, as in the striking mechanism of a clock. Fig. 2 shows an arrangement of this kind, wherein W is a wheel which by means of a spring or weight X is caused to make one revolution every time it is released by the timekeeping part of the clock. The wheel W is connected by a rod Y to a lever Z, that is pivoted at N to the lever M, which is provided with a lateral pin or projection I. The arrangement is such that once during each revolution of the wheel W the lever-arm Z will be moved up and down by means of the rod Y, the said arm on the downstroke coming in contact with the projection I, and thereby returning the sector L to its starting position. In each case although the sector L in returning to its starting position moves the projection I also back to its starting position the indicator K remains at the extreme reading which it has reached. As the part F of the friction-clutch slips on the part E thereof, it will be seen that the return action is not transmitted through the gearing D to the spindle A.

Owing to the principle upon which combined apparatus according to this invention operates, coupled with the fact that the production of meters for electric energy which are accurate for large as well as small powers and of accurate clocks presents no difficulty, it results that compound apparatus such as described may be made to afford practically accurate indications throughout a wide range.

What I claim is—

1. Combined electric measuring and indicating apparatus capable of integrating the amounts of electricity that shall have passed through the apparatus during a number of equal intervals of time and of indicating the greatest of these amounts, said apparatus comprising an integrating-meter, a body adapted to be actuated during each interval of time to an extent dependent upon the total quantity of electricity that shall have passed through said apparatus during the interval, an indicator adapted to be moved in one direction by said body and to remain in the position into which it is moved, and means for returning said body to its original position at the end of each interval of time.

2. Apparatus for measuring and indicating an electricity-supply, comprising an integrating electricity-meter, and an indicating device driven from said meter and adapted to indicate the greatest amount of current integrated by said meter during any one of a number of intervals of time.

3. Apparatus for measuring and indicating an electricity-supply, comprising an electricity-meter, a body arranged to be actuated from said meter to an extent dependent upon the quantity of electricity passing through the meter, an indicator adapted to be moved in one direction by said body and to remain in the position in which it is left, and means for restoring said body to its starting position at regular intervals of time.

4. Apparatus for measuring and indicating an electricity-supply, comprising an integrating electricity-meter, gearing coöperating with said meter, an actuating device arranged to be moved in one direction by said gearing, an indicator arranged to be moved in one direction by said actuating device and to remain in the position in which it is left, and means for setting back said actuating device at regular intervals of time.

5. Apparatus for measuring and indicating an electricity-supply, comprising an electricity-meter adapted to integrate the amounts of electricity that shall have passed through the apparatus during a number of equal intervals of time, a movable body adapted to be actuated during each interval of time to an extent dependent upon the total quantity of electricity that shall have passed through said apparatus during the interval, an indicator adapted to be moved in one direction by said body, and electromagnetic means adapted to be brought into action at regular intervals of time and to return said movable body to its starting position.

6. Apparatus for measuring and indicating an electricity-supply, comprising an electricity-meter adapted to integrate the amounts of electricity that shall have passed through the apparatus during a number of equal intervals of time, a friction-clutch, gearing connected to one part of said clutch and to said meter, an indicator adapted to be moved in one direction by the second part of said clutch, and means adapted to set back the second part of said clutch at regular intervals of time.

7. Apparatus for measuring and indicating an electricity-supply, comprising an electricity-meter adapted to integrate the amounts of electricity that shall have passed through the apparatus during a number of equal intervals of time, a friction-clutch, gearing connected to one part of said clutch and to said meter, an indicator adapted to be moved in one direction by the second part of said clutch, electromagnetic means adapted when brought into action to set back the second part of such clutch, and means for completing the circuit of said electromagnetic means at regular intervals.

8. Apparatus for measuring and indicating an electricity-supply, comprising an electricity-meter, a rotary friction-clutch having one part geared to said meter and a second part provided with a driving-pin, an indicator-arm mounted to rotate about the same axis as said clutch and arranged to be turned in one direction by said driving-pin, a pivoted toothed segment geared to the said second part of the clutch, and means for returning said segment and second part of said clutch to their original positions at regular intervals of time, substantially as described for the purpose specified.

9. Apparatus for measuring and indicating an electricity-supply, comprising an electricity-meter, a rotary friction-clutch having one part geared to said meter and a second part provided with a driving-pin, an indicator-arm mounted to rotate about the same axis as said clutch and arranged to be turned in one direction by said driving-pin, a pivoted toothed segment geared to the said second part of the clutch, and electromagnetic means adapted to be brought into action at regular intervals of time to return said segment and second part of said clutch with driving-pin to their starting positions, substantially as described.

10. Apparatus for measuring and indicating an electricity-supply, comprising an electricity-meter, a rotary friction-clutch having one part geared to said meter and a second part provided with a driving-pin, an indicator-arm mounted to rotate about the same axis as said clutch and arranged to be turned in one direction by said driving-pin, a pivoted toothed segment geared to the said second part of the clutch, a lever connected to said segment, an electromagnetic device comprising a coil and a movable core, said core being connected to said lever, and a circuit-closing device driven from the meter mechanism and adapted to close an electric circuit through said coil at regular intervals of time, substantially as described.

Signed at Newcastle-upon-Tyne, in the county of Northumberland, this 12th day of September, 1902.

CHARLES HESTERMAN MERZ.

Witnesses:
GEORGE ROCHESTER,
ELIAS YEOMAN.